F. LEWIS.
EGG SEPARATOR.
APPLICATION FILED DEC. 6, 1910.

990,758.

Patented Apr. 25, 1911.

Witnesses

Inventor
Frank Lewis

By Victor J. Evans
Attorney

UNITED STATES PATENT OFFICE.

FRANK LEWIS, OF PORTLAND, OREGON.

EGG-SEPARATOR.

990,758.   Specification of Letters Patent.   Patented Apr. 25, 1911.

Application filed December 6, 1910.   Serial No. 595,903.

*To all whom it may concern:*

Be it known that I, FRANK LEWIS, a citizen of the United States, residing at Portland, in the county of Multnomah and State of Oregon, have invented new and useful Improvements in Egg-Separators, of which the following is a specification.

This invention relates to egg separators and the object of the invention is the provision of a conveniently operated and simply constructed device by which the white of the egg may be properly separated from the yolk without breaking the latter and without wasting the white.

A still further object of the invention is the provision of a movable element adapted to separate the white from the yolk, together with means carried by the movable element for removing the white from the body of the device and thereby preventing waste.

Further objects of the invention will appear as the following description is read in connection with the accompanying drawing, which forms a part of this application, and in which:—

Figure 2:
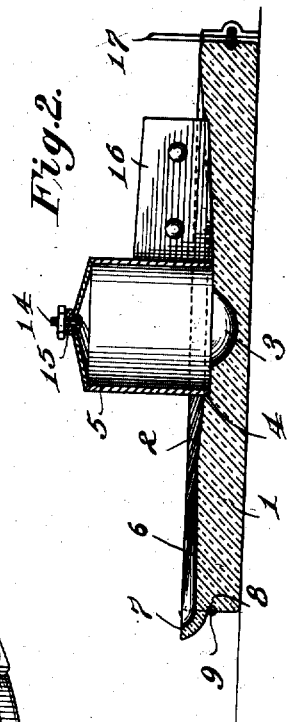
Figure 1:
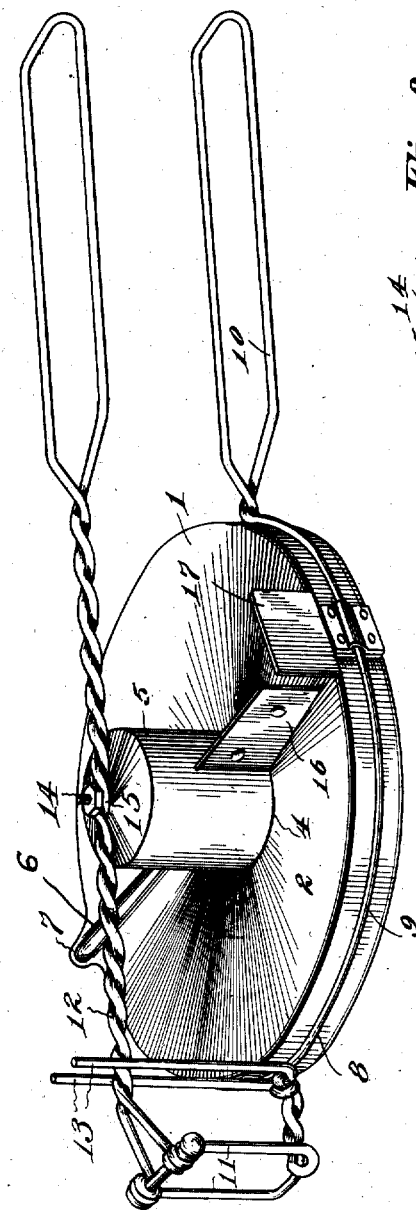

Figure 1 is a perspective view. Fig. 2 is a detailed vertical section.

Referring more particularly to the drawing, 1 represents the body of the device which is in the form of a circular disk of glass or other suitable material whose upper face is slightly concaved, as shown at 2, and is provided with a central socket or peculiarly shaped depression 3 which is surrounded by an annular recess 4 adapted to receive a separating cup 5. At one side of the body a radial groove 6 is formed which communicates with a projecting spout 7 adapted to facilitate the pouring of the white and yolk into cups or other receptacles. Secured around the body 1 in a groove 8 formed therein is a band 9 having secured to one side thereof a manipulating handle 10 and at the opposite end a laterally extending pivoting bracket 11 upon which the lever 12 is secured. This lever is guided in its movement by means of parallel rods 13 secured to the band 9 and extending upwardly on either side of the lever.

The cup 5 is provided with a vertical stub shaft 14 which is journaled in a bearing 15 carried by the lever 12 so that the cup may revolve upon the lever when desired. This method of mounting the cup is provided in order to permit the cleaning arm 16, which is secured to the cup, swinging around over the body to remove the white of the egg therefrom while the yolk is held by the cup within the socket 3. A suitable egg breaker is carried by the band 9 and extends above the body in the form of a wide sharp-edged plate 17.

In the operation of the device the egg is broken over the edge of the plate 17 and the yolk and white allowed to run down into the socket 3. As the yolk occupies most of the socket, the white will spread out around the concaved face of the body and when the cup is brought down into the recess 4 the yolk will be separated from the white and the handle 10 and the lever may be grasped and the device tilted so as to pour the white from the spout 7 into a suitable receptacle. Any of the white which clings to the body may be scraped into the receptacle by rotating the cleaning arm 16. After the white has all been removed from the body, the lever is raised with the cup and the yolk may be poured from the spout 7 into a separate receptacle.

Having thus described the invention, what I claim as new is:—

1. An egg separator including a body having a yolk receiving socket, a lever pivoted to the body, and means carried by the lever and adapted to coact with the body to hold the yolk in the socket while the white of the egg is being poured from the body.

2. An egg separator including a body having a concaved face and a yolk receiving socket therein, a lever pivoted to the body, means carried by the lever to coact with the body to hold the yolk in the socket and to permit the white to be poured from the body, and means carried by said yolk holding means for cleaning the egg from the body.

3. In an egg separator, a body having a concaved face and a yolk receiving socket formed therein, a lever pivoted to the body, an inverted cup revolubly mounted upon the lever and adapted to coact with the body to hold the yolk in the socket, and a cleaning arm carried by the cup and adapted to sweep over the body.

4. In an egg separator, a body having a concaved face and a yolk receiving socket formed therein, a lever pivoted to the body, an inverted cup revolubly mounted upon the lever and adapted to coact with the body to hold the yolk in the socket, together with means to guide the lever in its movements, and a handle for manipulating the body.

In testimony whereof I affix my signature in presence of two witnesses.

FRANK LEWIS.

Witnesses:
T. F. NOONAN,
F. E. MANNING.

Copies of this patent may be obtained for five cents each, by addressing the "Commissioner of Patents, Washington, D. C."